April 15, 1941.    J. A. SHAFER    2,238,452
BRAKE MECHANISM
Filed Oct. 23, 1937    2 Sheets-Sheet 1
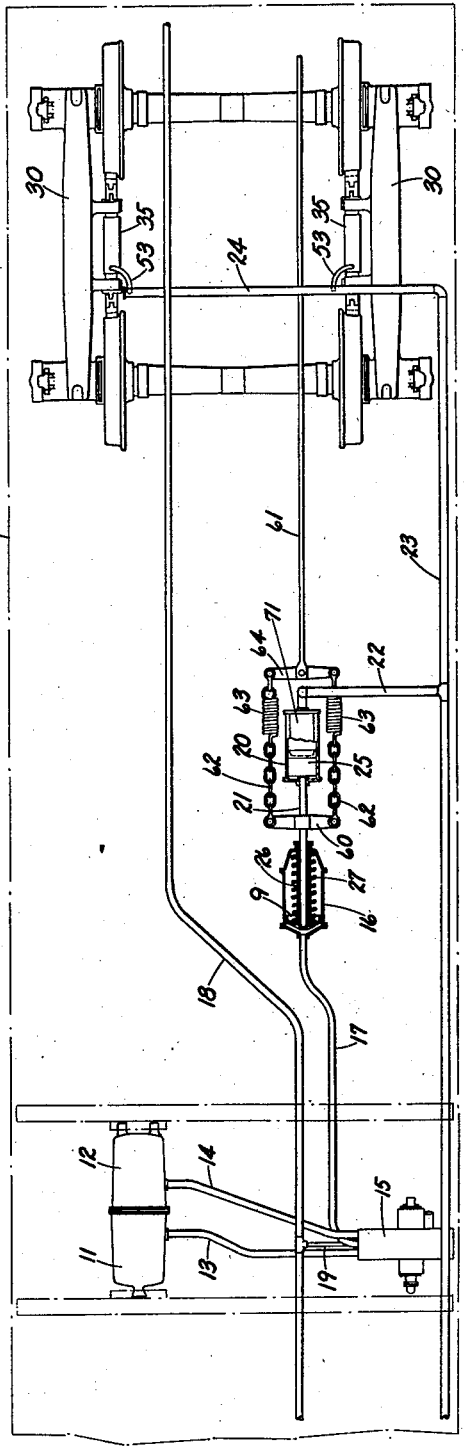
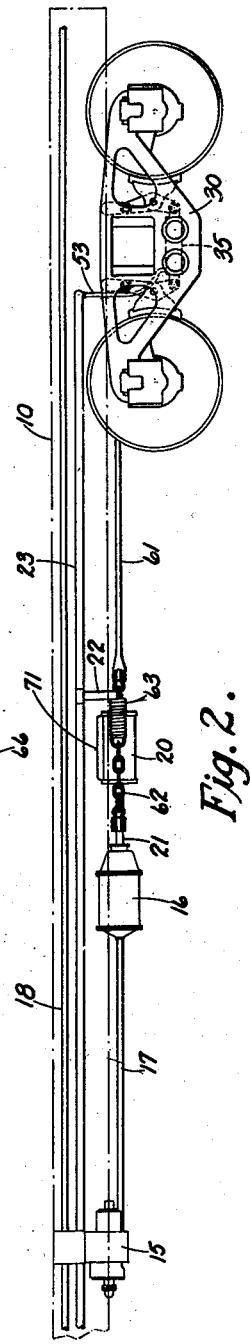
INVENTOR
James A. Shafer
BY
Clarence D. Kerr
ATTORNEY April 15, 1941. J. A. SHAFER 2,238,452
BRAKE MECHANISM
Filed Oct. 23, 1937 2 Sheets-Sheet 2
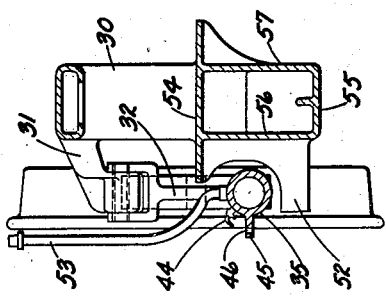
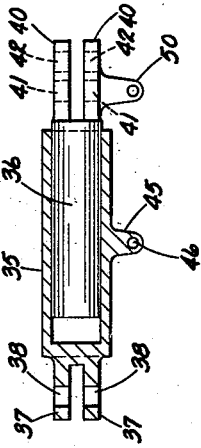
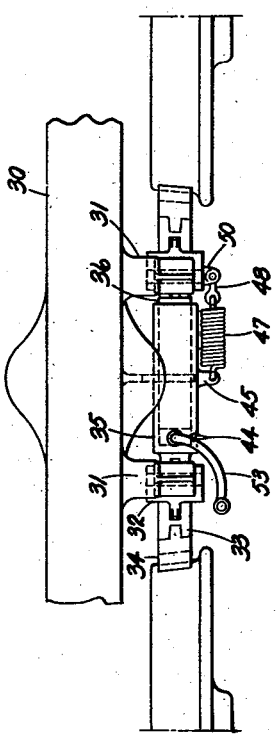
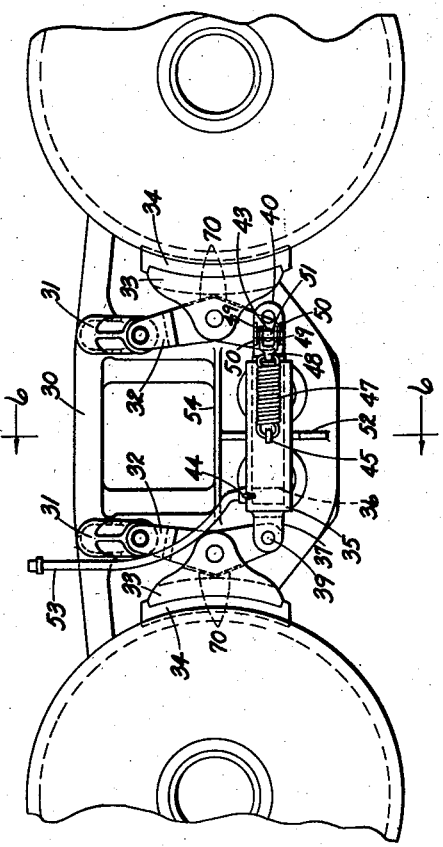
INVENTOR
James A. Shafer
BY
ATTORNEY Patented Apr. 15, 1941

2,238,452

UNITED STATES PATENT OFFICE 2,238,452

BRAKE MECHANISM

James A. Shafer, East Cleveland, Ohio, assignor to National Malleable and Steel Castings Company, Cleveland, Ohio, a corporation of Ohio Application October 23, 1937, Serial No. 170,538

4 Claims. (Cl. 188—153)

This invention relates to a brake system for railway vehicles and particularly to a system using a combination of air and hydraulic means for actuating the vehicle brakes.

An object of my invention is an improved brake system that uses the entire air portion of the brake means found on present-day equipment including valves, reservoirs and air cylinder. However, instead of transmitting pressure from the air cylinder to the brake shoes by means of rods, levers, and brake beams, my invention contemplates the use of hydraulic means operatively joining the air cylinder and brake shoes to actuate the latter. Not only does my invention eliminate the brake beams but it further obviates the use of safety devices for these members as well as for the bottom rod joining the brake beams to prevent their falling on the rail in the event of failure of certain parts.

My invention further permits the brakes to be applied without twisting the bolster since the mechanism is independent of and is not supported by this member. In the usual type of construction the fulcrum bracket for one of the brake levers is mounted on the bolster laterally of the center thereof and when the brakes are applied the force acting on this bracket causes the bolster to twist and one side frame to move ahead of the other. The truck axles and hence the wheels are, therefore, at an angle to their normal positions, resulting in greater flange wear of the wheels. My invention, as will be apparent, does away with this undesirable condition.

Another feature of my invention is the reduction of frictional losses by the elimination of the brake beams, brake rods, levers and supports for these members all of which are sources of considerable friction. Furthermore, track clearance is increased as a result of the elimination of certain of these parts. Moreover, there is eliminated the interference between certain of the brake rods and the trucks in passing around curves.

In the accompanying drawings:

Figure 1 is a plan view of part of a car underframe in dot-dash lines with the brake mechanism and truck shown in solid lines.

Figure 2 is a view in elevation of the device shown in Fig. 1.

Figure 3 shows a modification of part of the mechanism of Fig. 1.

Figure 4 is a plan view of part of a car truck with an embodiment of my brake mechanism applied.

Figure 5 is a view in elevation of the parts shown in Fig. 4, looking at the inner side of the truck side frame.

Figure 6 is a vertical sectional view taken on line 6—6 of Fig. 5; and

Figure 7 is a horizontal sectional view of the brake cylinder on the truck.

In Figs. 1 and 2 there is shown a railway car underframe 10 in dot-dash lines. The auxiliary and emergency air reservoirs 11 and 12 respectively, are joined by pipe lines 13 and 14 to the brake valve 15 (the present standard AB operating valve is shown) and the latter is connected with the air cylinder 16 by a pipe 17, all in the usual manner. The usual train line or brake pipe 18, which runs the full length of the car, is also connected with the brake valve 15 by pipe 19. Brake pipe 18 extends the length of the train by means of couplings between adjacent cars and by variations of the air pressure in said pipe the valve 15 is actuated to control movement of the piston 9 in air cylinder 16. The mechanism so far described or its equivalent is found on practically all present-day railway rolling stock and its construction and operation is understood by those skilled in the art. The particular arrangement shown is A. A. R. standard equipment and its use is required on all new railway cars that are built. My invention, however, can be used with other brake valves such as the previous standard brake valve known as the type "K" valve with the same advantageous results. Instead of operating the brakes by means of rods and levers moved by the piston in the air cylinder, my invention involves the use of fluid under pressure for operating the brakes.

The piston 9 in cylinder 16 is adapted to be moved to the right as viewed in Fig. 1 upon the admission of air into the cylinder through pipe 17. A cylinder 20 also has a piston 25 which is operatively connected with the piston in cylinder 16 by a rod 21 so that movements of the two pistons will occur simultaneously. Rod 21 is loosely received in a sleeve 26 connected to piston 9 so that the rod may be moved in operating the brakes by hand (to be later described) without moving said piston. A spring 27 normally maintains piston 9 at the left end of the cylinder 16. A pipe 22 joints one end of cylinder 20 with pipe line 23 extending substantially the length of the car. At each end thereof line 23 extends transversely of the car, as at 24, over the car truck. Only one truck is shown in Figs. 1 and 2 but it will be understood that a similar truck is at the other end of the car with a pipe 24 over the truck.

My invention is particularly adapted for use with the type of car truck shown in my Patent 1,973,664 issued September 11, 1934. In this truck the customary spring plank is omitted and the side frames tied together, at their center portions, by the bolster only. The space immediately inward of the side frame that would normally be occupied by the spring plank, is, in my present invention used to accommodate part of the brake mechanism.

Each truck comprises a pair of side frames 30 tied together by a bolster (not shown). Each side frame has a tension member including a top wall or shelf 54, a bottom wall 55, and vertical connecting walls 56 and 57. Extending inwardly from each side frame are brackets 31 to which are pivoted levers 32, and intermediate the ends of each lever 32 is pivoted a brake head 33, each head supporting a brake shoe 34. The brackets 31 may be standard brake hanger brackets commonly used with present mechanical brake systems.

Adjacent the lower ends of levers 32 and between top and bottom walls 54 and 55 is a cylinder 35 and a piston 36 in the cylinder. Projecting outwardly from the closed end of cylinder 35 are arms 37 each having an opening 38 for reception of a pin 39 which pivotally joins one of the levers 32 to the cylinder. Similarly arms 40 project outwardly from piston 36 for pivotal connection to the other lever 32. It will be observed that arms 40 have pairs of openings 41 and 42 for alternatively receiving pin 43 so that adjustment may be made between the piston and its associated arm 32 to compensate for wear of the brake shoes.

Projecting outwardly from one side of cylinder 35 is a bracket 45 having an opening 46 through which is threaded one end of a spring 47. The other end of the spring is supported by a yoke 48, the arms 49 of which are joined by a pin 51 to outwardly projecting brackets 50 on the adjacent arm 40 of piston 36. The space between arms 49 of yoke 48 is sufficient to permit insertion and removal of pin 43, after the pin 51 has been removed. The purpose of spring 47 is to normally pull the brake shoes away from the wheels to prevent undesired wear therebetween. A bracket 52 extending laterally from the side frame and beneath cylinder 35 prevents the latter from falling on the rail in the event of failure of one of the supporting members.

Each cylinder 35 is connected to fluid pipe line 24 by a flexible hose 53. A stop-cock or vent 44 near the closed end of each cylinder 35 is provided to permit the removal of any air that may accumulate in the fluid lines. Thus when cylinders 20 and 35 and the interconnecting fluid pipe lines are properly filled with fluid, movement of the piston in cylinder 20 by means of air admitted to cylinder 16 from the air reservoir of the car, will introduce more fluid in cylinders 35, causing relative movement between cylinders 35 and their respective pistons 36 until the brake shoes engage the wheels. The fluid will continue to flow in the pipe lines, under pressure from cylinder 20, until each of the brake shoes has engaged its associated wheel. Furthermore, continued increase in pressure in cylinder 20 will be transmitted equally to all of the wheels until the desired retarding force has been built up.

When it is desired to release the brakes, the air pressure is released in cylinder 16 and piston 9 is moved by spring 27 to its original position at the left of cylinder 16. Springs 47 will then draw cylinders 35 and their respective pistons towards each other, thus separating the brake shoes from the wheels. At the same time the fluid in cylinders 35 will be forced into the fluid pipe lines, causing piston 25 to move to its original position.

For the purpose of operating the brakes by manual means I provide a cross arm 60 secured to rod 21 which may be joined with one end of the hand brake rod 61 through chains 62, springs 63 and link 64. The other end of rod 61 is connected to the usual hand brake mechanism (not shown) by which a pull is exerted on rod 61 which forces the piston in cylinder 20 inwardly to apply the brakes in the manner described above. It is preferable to join arms 60 and 64 at least in part by flexible members such as chains 62 so as to permit rod 61 to remain stationary when the brakes are operated by air. It is also desirable that springs 63 be of such capacity that they will expand somewhat when the brakes are lightly applied by manual means and such that the maximum force desired may be exerted upon them without exceeding their capacity. Thus, in the event of any leakage in the fluid system, between cylinders 20 and 35, during the time the hand brake is set, continued pressure will be applied through the action of springs 63 forcing the piston into cylinder 20.

In Fig. 3 there is shown a modification in which link 64 is replaced by a leaf spring 65, the latter being joined with cross-arm 60 by the longer chains 66. The action of the leaf spring in maintaining brake pressure in the event of leakage will be similar to that of coil springs 63.

To prevent the brake shoes from tipping to such an extent that they touch the wheels, when in retracted position surfaces 70 may be formed on the brake heads which will contact levers 32 and limit rotative movement of the brake heads. A reservoir 71 above cylinder 20 supplies additional fluid, to compensate for any loss through leakage in the system, as is common practice in hydraulic brake systems used on automobiles.

By proportioning the relative diameters of cylinders 20 and 35 the braking force applied to the wheels can be made to be the same as would be obtained by the use of the standard mechanical connections between air cylinder 16 and the brake shoes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a railway vehicle having a truck at each end thereof and a brake valve, air reservoirs and air cylinder and also having means for manual operation of said vehicle brakes, a master fluid containing cylinder operatively joining said air cylinder, fluid containing cylinders on said vehicle trucks and operatively connected to the brake shoes thereof, fluid containing means joining said master cylinder and said truck cylinders, and means comprising a spring joining said manual operating means and the piston in said master cylinder for actuating said latter cylinder.

2. In a railway vehicle having a truck at each end thereof and a brake valve, air reservoirs and air cylinder and also having means for manual operation of said vehicle brakes, a master fluid containing cylinder operatively joining said air cylinder, fluid containing cylinders on said vehicle trucks and operatively connected to the brake shoes thereof, fluid containing means joining said master cylinder and said truck cylinders, and means including a leaf spring joining said manual operating means and the piston in said master cylinder for actuating said latter cylinder.

3. A vehicle brake system comprising braking means, hydraulic means including a master cylinder and a piston therein for effecting application of said braking means, fluid pressure responsive means for actuating said piston, manual means for actuating said piston, means connecting said fluid pressure responsive means and said piston for enabling operation of the latter by said manual means, and resilient means interposed between said manual means and said piston.

4. A vehicle comprising a plurality of trucks, braking means carried by each of said trucks, hydraulic means carried by each of said trucks for operating the respective braking means, master means comprising a hydraulic cylinder carried by said vehicle for causing operation of said hydraulic means, manual means for controlling said cylinder, and resilient means interposed between said manual means and said cylinder whereby operation of the latter is effected through said resilient means.

JAMES A. SHAFER.